(12) United States Patent
Singleton et al.

(10) Patent No.: US 11,117,668 B2
(45) Date of Patent: Sep. 14, 2021

(54) SPACE SAVING SEATING SYSTEM

(71) Applicant: The Boeing Company, Chicago, IL (US)

(72) Inventors: Christopher B. Singleton, Bothell, WA (US); Joshua Y. Lee, Seattle, WA (US)

(73) Assignee: The Boeing Company, Chicago, IL (US)

( * ) Notice: Subject to any disclaimer, the term of this patent is extended or adjusted under 35 U.S.C. 154(b) by 204 days.

(21) Appl. No.: 16/528,142

(22) Filed: Jul. 31, 2019

(65) Prior Publication Data

US 2021/0031925 A1    Feb. 4, 2021

(51) Int. Cl.
*B64D 11/06* (2006.01)
*E05F 13/04* (2006.01)
*B64C 1/14* (2006.01)

(52) U.S. Cl.
CPC ........ *B64D 11/0602* (2014.12); *B64C 1/1438* (2013.01); *B64C 1/1461* (2013.01); *E05F 13/04* (2013.01)

(58) Field of Classification Search
CPC . B64D 11/0602; B64D 11/064; B64C 1/1438; B64C 1/1461; E05F 13/04
See application file for complete search history.

(56) References Cited

U.S. PATENT DOCUMENTS

| | | | | |
|---|---|---|---|---|
| 6,152,401 A | * | 11/2000 | Green | B60N 2/24 244/118.6 |
| 6,186,444 B1 | * | 2/2001 | Steel | B64C 1/1423 244/129.5 |
| 2010/0263287 A1 | * | 10/2010 | Nakano | E05D 5/0246 49/360 |
| 2017/0283064 A1 | * | 10/2017 | Robinson | B64C 1/1423 |

\* cited by examiner

*Primary Examiner* — Rodney A Bonnette
(74) *Attorney, Agent, or Firm* — McDonnell Boehnen Hulbert & Berghoff LLP

(57) ABSTRACT

In an example, a seating system includes a seat comprising a chamber, a wall structure adjacent to the seat and defining a compartment, a door insert configured to move within the compartment between a starting position and a retracted position, wherein in the starting position, the door is adjacent to the seat and blocks access to the compartment, and in the retracted position, the door is retracted into the wall structure and provides access to the compartment, a closed channel extending from the chamber and operably connected to the door, and a piston operably coupled to the seat and positioned within the chamber, wherein when a load is applied to the seat, the piston is compressed, moving the door from the starting position to the retracted position, and when the load is removed, the piston is decompressed, causing the door to move from the retracted position to the starting position.

20 Claims, 10 Drawing Sheets

SPACE SAVING SEATING SYSTEM

FIELD

The present disclosure relates generally to a space saving seating system for an aircraft, and more particularly, to a seating system having a piston-operated movable door.

BACKGROUND

Space can be a valuable commodity within aircrafts, particularly in an aircraft cabin. In existing aircrafts, seats and other objects within the aircraft can be densely arranged close to each other and close to adjacent monuments (e.g., galleys, closets, lavatories, dividers, workstations for flight attendants or crew members, etc.). In some existing aircrafts, some seats (e.g., seats used by crew members and flight attendants) might take up an undesirable amount of space.

To address this issue, some existing aircrafts include monuments with curved walls to save space. However, such monuments might not fully enclose an area as desired. Additionally or alternatively, some existing aircrafts incorporate mechanisms where a seat can be built in to a wall of a monument or otherwise integrated with the monument so that the seat can be stored or made to take up less space when not in use. As a more particular example, some existing aircrafts can include a workstation (e.g., a video control center) with a built-in seat having a rotating arm, sliding mechanism, or other mechanism to provide the necessary space for a flight attendant to sit down in the seat and get out of the seat. However, the sweep, slide, or other motion of the seat in such existing aircrafts might still require valuable space in order to operate and accommodate an individual, thus making it more difficult to optimize the usage of space in the aircrafts and possibly interfering with other individuals' usage of space in the aircrafts. For example, a rotating arm for a seat might protrude into an aisleway or other area where passengers are seating or walking around the cabin.

What is needed is a seating system that takes up less space than existing systems, preferably without undo effort from a user of the seating system.

SUMMARY

In an example, a seating system is described. The seating system comprises a seat comprising a chamber. The seating system also comprises a wall structure positioned adjacent to the seat, where the wall structure defines a compartment. The seating system also comprises a door insert configured to move within the compartment between a starting position and a retracted position, where in the starting position, the door insert is positioned adjacent to the seat and blocks access to the compartment, and in the retracted position, the door insert is retracted into the wall structure and provides access to the compartment. The seating system also comprises a closed channel extending from the chamber and operably connected to the door insert. The seating system also comprises a piston operably coupled to the seat and positioned within the chamber, where in response to a load being applied to the seat, the piston is compressed and pressure is provided through the closed channel and onto the door insert, thereby moving the door insert from the starting position to the retracted position, and in response to the load being removed from the seat, the piston is decompressed and the pressure is released through the closed channel, thereby causing the door insert to move from the retracted position to the starting position.

In another example, a method for assembling a seating system is described. The method comprises positioning a seat adjacent to a wall structure, where the seat comprises a chamber, where a piston is operably coupled to the seat and positioned within the chamber, and where the wall structure defines a compartment. The method also comprises moveably inserting a door insert into the wall structure such that the door insert is movable within the compartment between a starting position and a retracted position, where, in the starting position, the door insert is positioned adjacent to the seat and blocks access to the compartment, and, in the retracted position, the door insert is retracted into the wall structure and provides access to the compartment. The method also comprises operably connecting a closed channel between the chamber and the door insert, where, in response to a load being applied to the seat, the piston is compressed and pressure is provided through the closed channel and onto the door insert, thereby moving the door insert from the starting position to the retracted position, and where, in response to the load being removed from the seat, the piston is decompressed and the pressure is released through the closed channel, thereby causing the door insert to move from the retracted position to the starting position.

In another example, an aircraft is described. The aircraft comprises a fuselage. The aircraft also comprises a floor structure arranged within the fuselage. The aircraft also comprises a seating system. The seating system comprises a wall structure coupled to the floor structure and extending substantially vertical to the floor structure, where the wall structure defines a compartment. The seating system also comprises a seat positioned adjacent to the wall structure, the seat comprising a chamber. The seating system also comprises a door insert configured to move within the compartment between a starting position and a retracted position, where in the starting position, the door insert is positioned adjacent to the seat and blocks access to the compartment, and in the retracted position, the door insert is retracted into the wall structure and provides access to the compartment. The seating system also comprises a closed channel extending from the chamber and operably connected to the door insert. The seating system also comprises a piston operably coupled to the seat and positioned within the chamber, where in response to a load being applied to the seat, the piston is compressed and pressure is provided through the closed channel and onto the door insert, thereby moving the door insert from the starting position to the retracted position, and in response to the load being removed from the seat, the piston is decompressed and the pressure is released through the closed channel, thereby causing the door insert to move from the retracted position to the starting position.

The features, functions, and advantages that have been discussed can be achieved independently in various examples or may be combined in yet other examples. Further details of the examples can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

DETAILED DESCRIPTION

Figure 1:
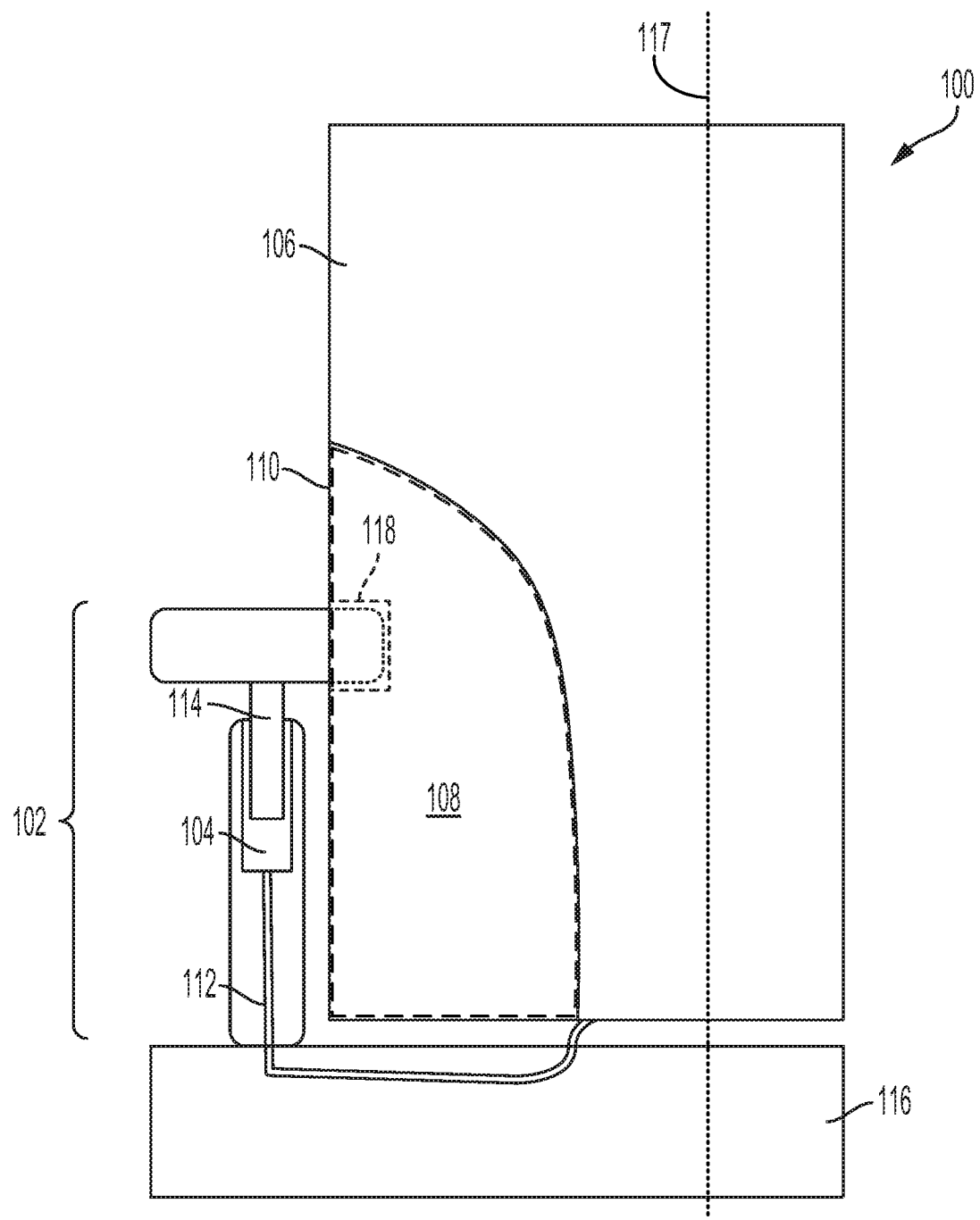
FIG. 1 depicts an example of a seating system, according to an example implementation.

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

By the terms "substantially," "about," "approximately," and "proximate" used herein, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Unless otherwise specifically noted, elements depicted in the drawings are not necessarily drawn to scale.

Within examples, described herein is a seating system and a method for assembling the seating system, particularly a seating system designed and operative to save space in an aircraft or other location in which the seating system is implemented. In this disclosure, examples are described primarily with respect to an aircraft. However, it should be understood that, in other implementations, the disclosed seating system can be implemented in vehicles other than an aircraft, such as an automobile, and/or can be implemented in other contexts and locations, such as in buildings.

The disclosed seating system includes a piston operably coupled to a seat and also includes a door insert that is moveably inserted into a wall within the aircraft, such as a wall of a monument (e.g., video control center). The door insert provides or blocks access to a compartment in which a user can place their legs when they are seated. In particular, when a user sits on the seat, the piston is compressed, thus providing pressure onto a door insert that is moveably inserted into a wall and pushing the door insert back to a retracted position. With the door insert in the retracted position, the user can then move their legs or other portion of their body into the compartment. As long as the user is seated, pressure is maintained on the door insert, thus holding the door insert in the retracted position. Once the user removes their weight from the seat, the piston retracts, pressure is removed from the door insert, and thus, the door insert can move back to a starting position. As so arranged, the disclosed seating system can advantageously save space in an aircraft, since the seat can be positioned close (e.g., abutting or within a few centimeters) to the wall structure, thus increasing the space for other objects or areas (e.g., passenger seats or walkways) in the aircraft.

These and other improvements are described in more detail below. Implementations described below are for purposes of example. The implementations described below, as well as other implementations, may provide other improvements as well.

Referring now to the figures, FIG. 1 is an example of a seating system 100. The seating system 100 includes a seat 102 comprising a chamber 104, and a wall structure 106 positioned adjacent to the seat 102 and defining a compartment 108. The seating system 100 also includes a door insert 110 configured to move within the compartment 108, a closed channel 112 extending from the chamber 104 and operably connected to the door insert 110, and a piston 114 operably coupled to the seat and positioned within the chamber 104. In addition to the seating system 100, FIG. 1 shows a floor structure 116 to which the wall structure 106 can be coupled. FIG. 1 also shows a reference axis 117 running vertically and substantially perpendicular to the floor structure 116.

The seat 102 can take the form of a chair, stool, or other apparatus on or in which a user can sit. As an example, the seat 102 can include a top portion (e.g., a seat cushion or stool top) and a bottom portion (e.g., a shaft, frame, and/or a base). The bottom portion can be coupled to the floor structure 116 such that it extends substantially vertical to the floor structure 116 (i.e., substantially parallel to the reference axis 117). As shown in FIG. 1, the seat 102 is substantially upright, although in alternative embodiments, the seat 102 might not be upright. Further, in some embodiments, the seat 102 can include a swivel and/or a mechanism for adjusting a height of the seat 102. Other example seats are possible as well.

The chamber 104 is a space within the seat 102 in which the piston 114 can be positioned and within which the piston 114 can move. For example, the chamber 104 can be located within a shaft of the seat 102, below a seat cushion or other type of top portion of the seat 102.

The wall structure 106 is a wall that can take various forms and can be made of various materials. For example, the wall structure 106 can be made of one or more composite (e.g., fiberglass) or aluminum panels. In some embodiments, the wall structure 106 can be a wall of a monument arranged within the aircraft, such as a wall of a video control center.

Further, in some embodiments, the wall structure 106 can be attached to the floor structure 116 and can extend substantially vertical thereto (i.e., substantially parallel to the reference axis 117). As shown in FIG. 1, the wall structure 106 is substantially upright, although in alternative embodiments, the wall structure 106 might not be upright.

The compartment 108 is an open space defined by the wall structure 106 and accessible via the door insert 110. For example, the compartment 108 can be an open space configured for legs of a user. In FIG. 1, the door insert 110 is preventing access to the compartment 108, and thus the compartment 108 is designated by a dashed line to show where the compartment 108 is located relative to the wall structure 106 and the rest of the seating system 100. As shown, a portion of the wall structure 106 that defines the compartment 108 is partially curved, such as to better accommodate the user's knees and legs, for example. In alternative embodiments, however, the compartment 108 might have a different shape and size.

The door insert 110 is a panel or other door-like structure that can be moveably inserted into, or otherwise operably coupled to, the wall structure 106 such that the door insert 110 is movable within the compartment 108 and functions to allow or block access to the compartment 108. As will be described in more detail herein, the door insert 110 is movable within the compartment 108 between a starting position and a retracted position. In the starting position, the door insert 110 is positioned adjacent to the seat 102 and blocks access to the compartment 108. In the retracted position, the door insert 110 is retracted into the wall structure 106 and provides access to the compartment 108. FIG. 1 illustrates an example of the door insert 110 in the starting position. In some embodiments, the door insert 110 can be configured and positioned to move horizontally (i.e., in a direction substantially perpendicular to the reference axis 117) within the compartment 108 between the starting position and the retracted position. In alternative embodiments, the door insert 110 can be configured and positioned to move vertically (i.e., in a direction substantially parallel to the reference axis 117, such as up into a portion of the wall structure 106 shown above the door insert 110 in FIG. 1) or can move in other directions.

The closed channel 112 is an elongated channel having a tubular shape or other shape and extending from the chamber 104 and operably coupled to the door insert 110. The closed channel 112 can be made of plastic, rubber, another type of material. Portions of the closed channel 112 can be formed within (and thus integral with) the seat 102 (e.g., the shaft of the seat 102) and/or the floor structure 116. Furthermore, the closed channel 112 can have a full lateral perimeter and only two openings—namely, a first opening at a first end of the closed channel 112 located at the chamber 104 and a second opening at a second, opposite end of the closed channel 112 located at an area proximate to the door insert 110. The closed channel 112 can carry air, hydraulic fluid, or another type of gas between the chamber 104 and the area proximate to the door insert 110. In some embodiments, the closed channel 112 can include only two openings (e.g., two opposing open ends) so that the air, fluid, or other gas can only travel between the chamber 104 and the area proximate to the door insert 110. Further, in some embodiments, the second opening might abut the door insert 110. In alternative embodiments, the second opening might be connected to another mechanism configured to help drive movement of the door insert 110 between the starting position and the retracted position.

The piston 114 can take the form of a block, disk, or other physical device having a cylindrical shape or other shape. The piston 114 can be fit closely within the chamber 104 (i.e., such that there is little space between the piston 114 and the walls of the chamber 104) so that the piston 114 can effectively push air, fluid, or another gas out of the chamber 104 and allow air, fluid, or another gas back into the chamber 104 with minimal or no leakage. As shown, the piston 114 is attached to an underside of a top portion of the seat 102. However, in alternative embodiments, the piston 114 can be operably coupled to the seat 102 in other manners.

The floor structure 116 is a floor that can take various forms and be made of various materials. For example, the floor structure 116 can be made of one or more composite or aluminum panels. In some embodiments, the floor structure 116 can be a floor arranged within a fuselage of an aircraft, such as a floor of the aircraft's cabin.

The distance at which the seat 102 is located relative to the wall structure 106 and the door insert 110 can vary depending on space considerations. For example, to increase the amount of space saved by the seating system 100, the door insert 110 can include a recess 118 that houses a portion of the seat 102 (e.g., the top portion of the seat 102) when the door insert 110 is in the starting position. An example embodiment of this is shown in FIG. 1, with dashed lines designating the recess 118 location. As so arranged, the seating system 100 can allow for the seat 102 to be placed closer to the wall structure 106 and the door insert 110 (e.g., such that the bottom portion of the seat 102 is centimeters from the door insert 110), thereby saving additional space. In alternative embodiments, the seat 102 could be located just as close to the door insert 110 as previously described in the aforementioned embodiment, but the top portion of the seat 102 can take a smaller form that does not necessitate a recess in the door insert 110.

In operation, movement of the piston 114 drives motion of the door insert 110 between the starting position and the retracted position. In response to a load (e.g., the weight of a user) being applied to the seat 102, the piston 114 is compressed and pressure is provided through the closed channel 112 and onto the door insert 110, thereby moving the door insert 110 from the starting position to the retracted position.

Figure 2:
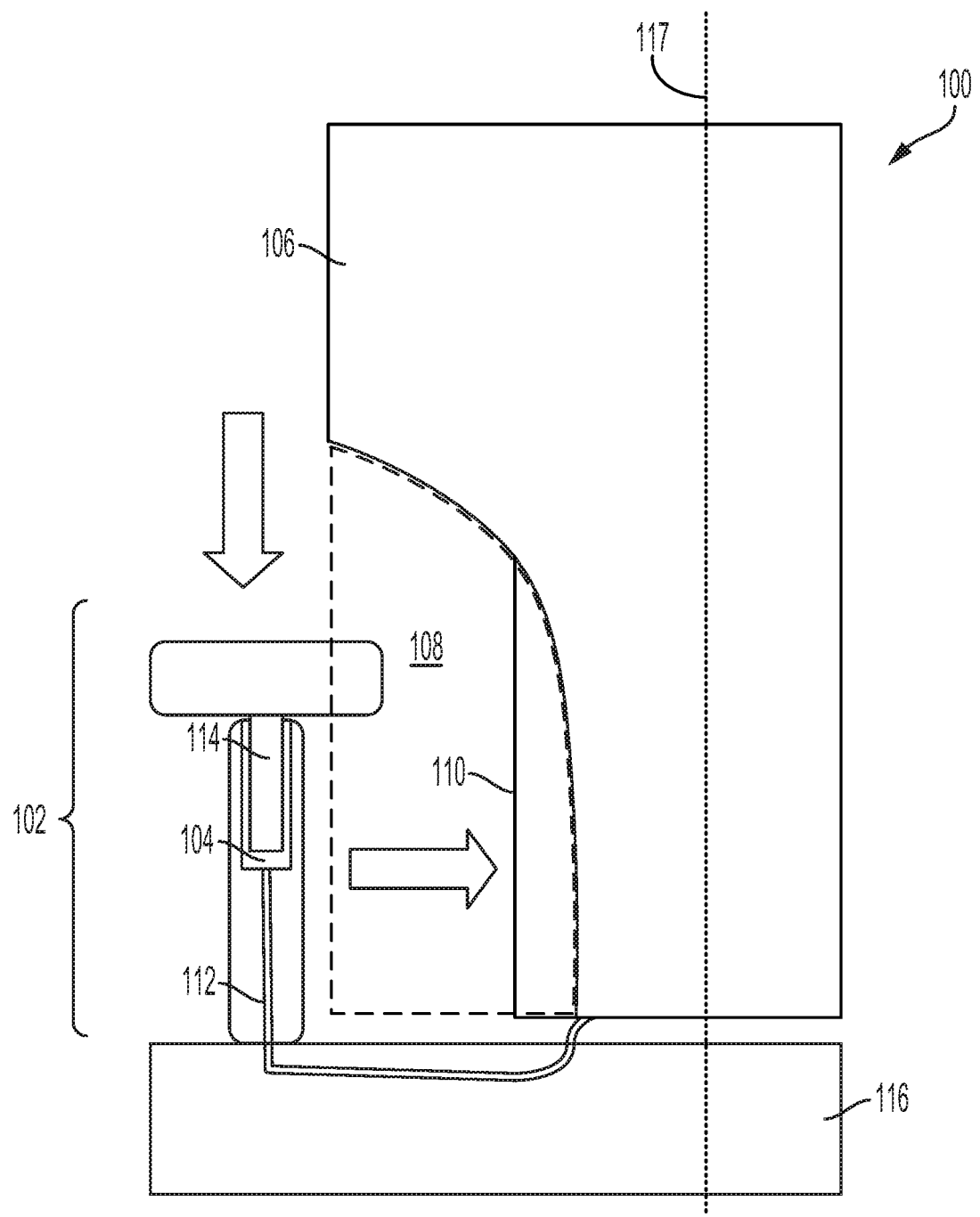
FIG. 2 depicts the seating system of FIG. 1 in operation, according to an example implementation.

FIG. 2 depicts the seating system 100 in the retracted position. FIG. 2 also includes an arrow that illustrates the movement of the piston 114 that causes the door insert 110 to move from the starting position to the retracted position. As shown, the load is applied in a downward direction onto the seat 102. FIG. 2 also includes another arrow to illustrate the movement of the door insert 110 caused by the piston 114.

Furthermore, in response to the load being removed from the seat 102, the piston 114 is decompressed and the pressure is released through the closed channel 112, thereby causing the door insert 110 to move from the retracted position to the starting position.

Figure 3:
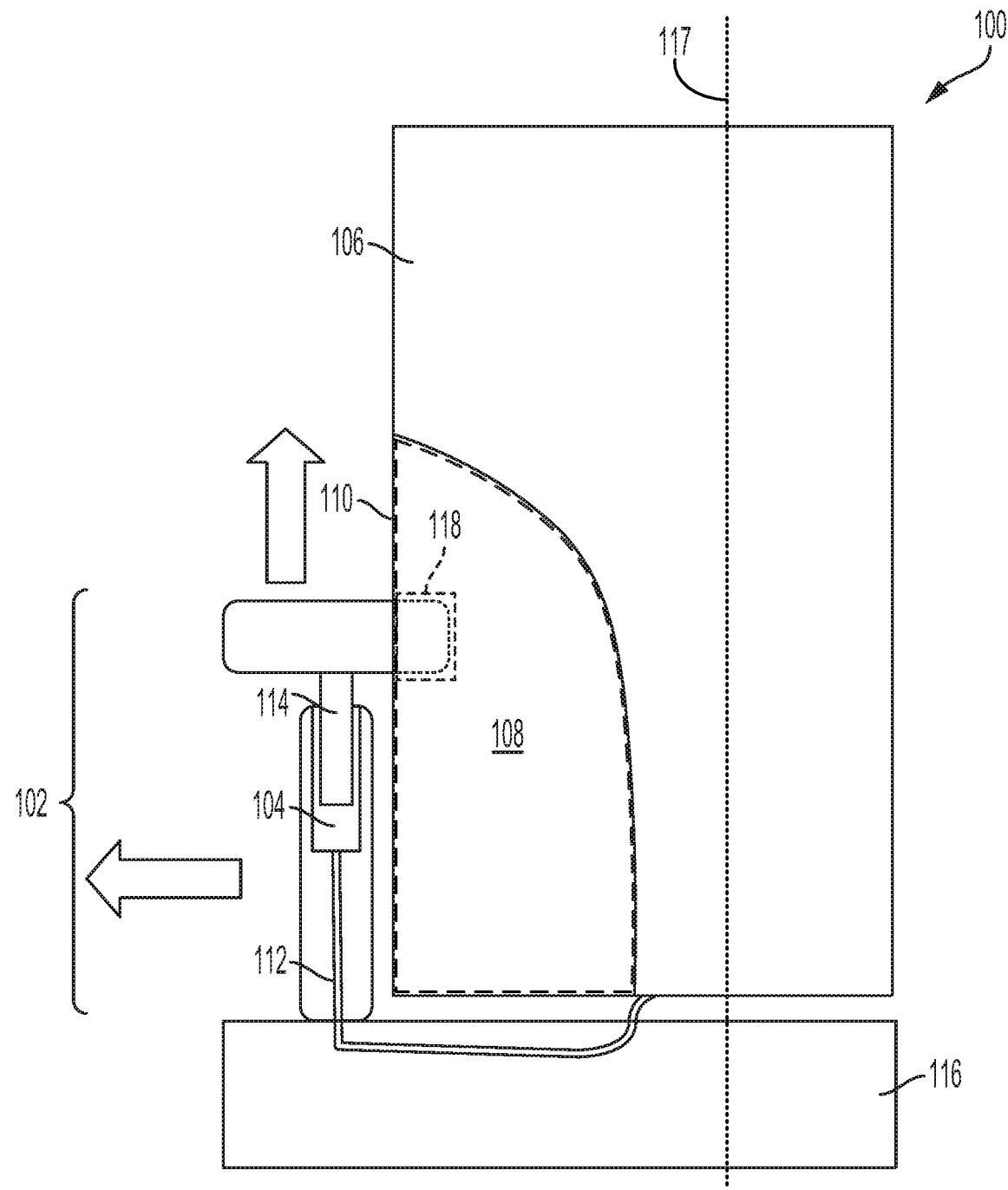
FIG. 3 depicts the seating system of FIG. 1 in operation, according to an example implementation.

FIG. 3 depicts the seating system 100 after the load has been removed and the door insert 110 has been moved back to the starting position. FIG. 3 also includes an arrow illustrating the movement of the piston 114 that causes the door insert 110 to move back to the starting position, as well as an arrow illustrating the movement of the door insert 110.

Some embodiments of the seating system 100 can include additional components to facilitate the operation described above. Examples of such components will now be described in more detail.

Figure 4:
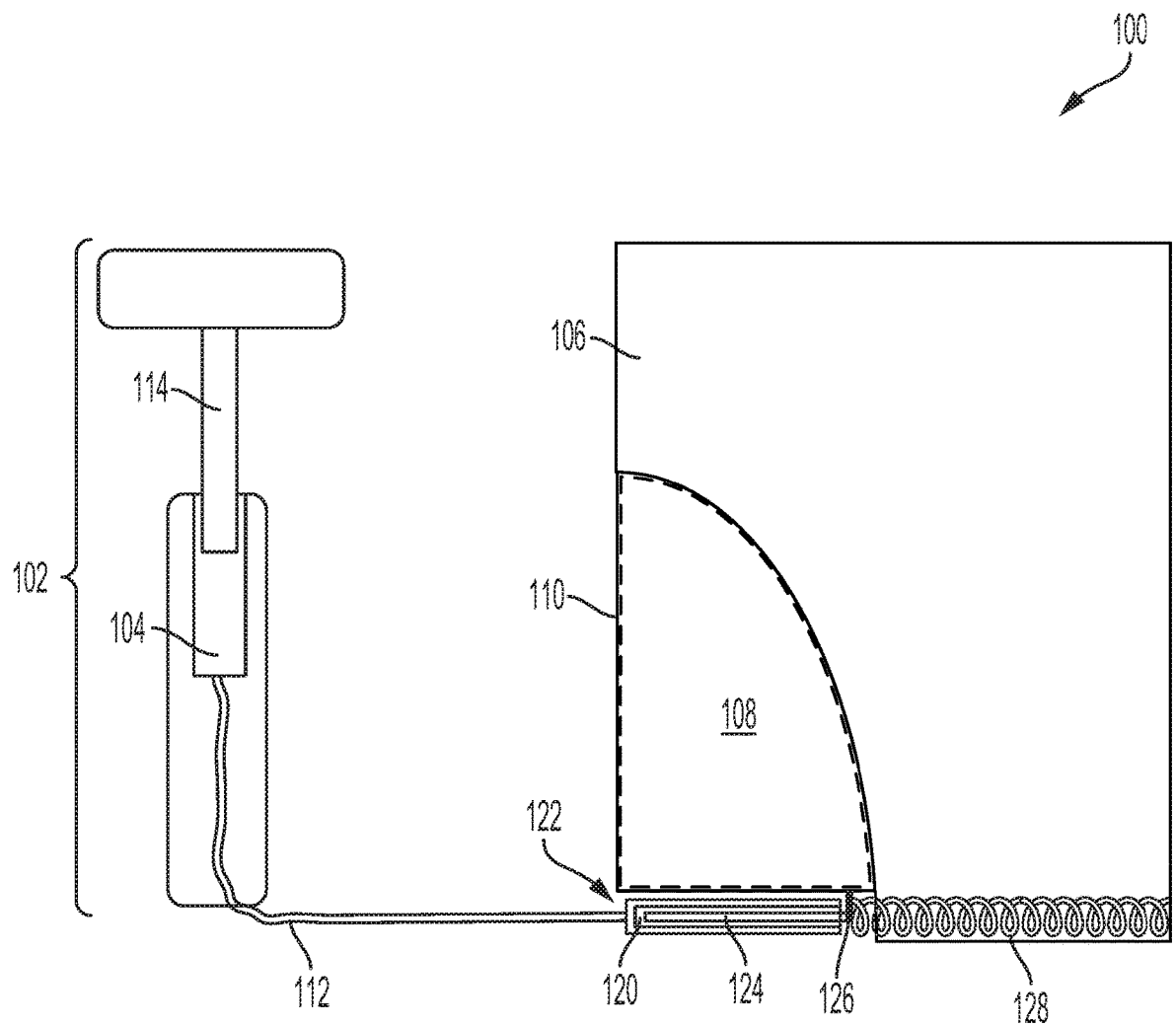
FIG. 4 depicts additional components of the seating system of FIG. 1, and also depicts the seating system of FIG. 1 in operation, according to an example implementation.

FIG. 4 depicts additional components of the seating system 100. In addition to the components described above and shown in FIGS. 1, 2, and 3, the seating system 100 shown in FIG. 4 includes a second chamber 120 connected to a distal end 122 of the closed channel 112, a second piston 124 positioned within the second chamber 120, a flange 126, and a spring 128 operably connected between the door insert 110 and the wall structure 106.

The second chamber 120 is a space in which the second piston 124 can be positioned and within which the second piston 124 can move. In some embodiments, the second chamber 120 can be coupled to the floor structure (not shown in FIG. 4). For example, the floor structure can include a recess in which the second chamber 120 can be positioned and attached to the floor structure. As another example, the second chamber 120 can be embedded within the floor structure such that the second chamber 120 is not visible by a user during operation. Other examples are possible as well.

The second piston 124 can take the form of a block, disk, or other physical device having a cylindrical shape or other shape. The second piston 124 can be fit closely within the second chamber 120 (i.e., such that there is little space between the second piston 124 and the walls of the second chamber 120) so that the second piston 124 can effectively push air, fluid, or another gas out of the second chamber 120 and allow air, fluid, or another gas back into the second chamber 120 with minimal or no leakage.

The flange 126 is a physical protruding member that can be integral with the door insert 110 or can be a separate component that is attached (e.g., fastened or welded) to the door insert 110. Although operation of the seating system 100 will be primarily described as involving the second piston 124 pushing against or otherwise contacting the flange 126, it should be understood that, in alternative embodiments, the seating system 100 might not include the flange 126, in which case the second piston 124 might push or otherwise contact another surface of the door insert 110. In other alternative embodiments that do not include the second piston 124, pressure can be provided onto the flange 126 or another surface of the door insert 110 when the load is applied to the seat 102, thereby pushing the door insert 110. In some alternative embodiments, the seating system 100 might include a pressure switch and a motor, where the pressure switch is operably connected the motor and configured to drive the motor to move the door insert between the starting position and the retracted position. In such embodiments, a load on the seat 102 (or removal of the load) might activate (or deactivate) the pressure switch and drive the motor to open the door insert to the retracted position (or close the door insert to the starting position). Other alternatives are possible as well.

The spring 128 can be an elastic device, made of metal or another material, that is configured and positioned to bias the door insert 110 toward the starting position. To facilitate this, one end of the spring 128 can be fixedly attached to the door insert 110 and an opposite end of the spring 128 can be fixedly attached to the wall structure 106 or another type of surface. In alternative embodiments, another type of biasing device can be used instead of the spring 128 to bias the door insert 110 toward the starting position. In other alternative embodiments, the seating system 100 might not include a biasing member, but the seating system 100 can include another type of mechanism for biasing the door insert 110 closed. For example, a track on which the door insert 110 slides can be angled such that gravity biases the door insert 110 closed, as opposed to a spring or other biasing member. Other examples are possible as well.

In operation, movement of the piston 114 drives motion of the second piston 124, which in turn drives motion of the door insert 110 between the starting position and the retracted position. FIG. 4 depicts the seating system 100 in the starting position.

In response to the load being applied to the seat 102, the piston 114 is compressed and pressure is provided through the closed channel 112 and into the second chamber 120, thereby pushing the second piston 124 onto the door insert 110 and moving the door insert 110 from the starting position to the retracted position.

Figure 5:
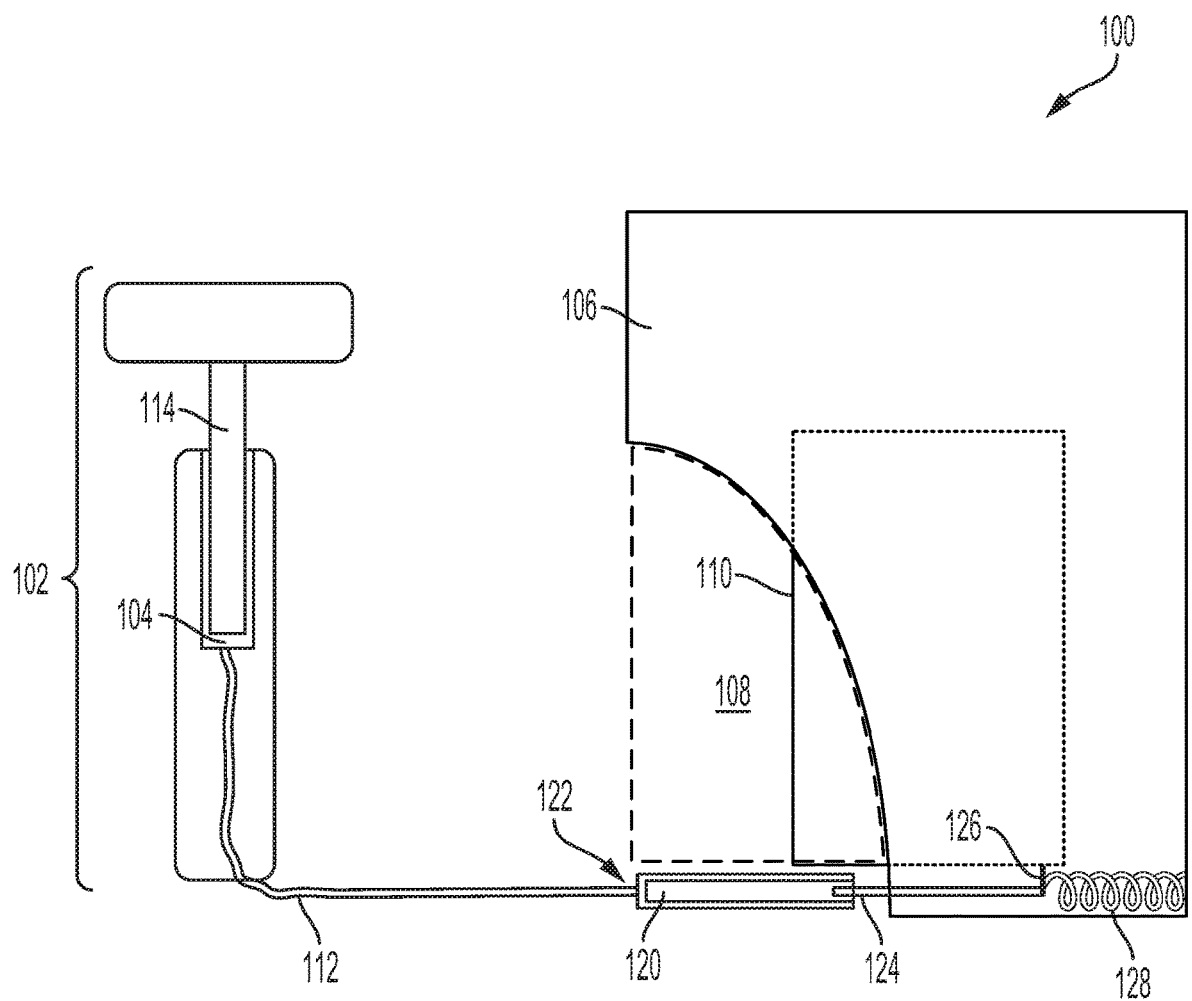
FIG. 5 depicts additional components of the seating system of FIG. 1, and also depicts the seating system of FIG. 1 in operation, according to an example implementation.

FIG. 5 depicts the seating system 100 in the retracted position. As shown, the piston 114 is compressed and positioned near a bottom of the chamber 104. As further shown, the second piston 124 is pushed out of the second chamber 120 onto the flange 126, which compresses the spring 128.

Furthermore, in response to the load being removed from the seat 102, the piston 114 is decompressed, the pressure in the second chamber 120 is released through the closed channel 112, and the second piston 124 retracts into the second chamber 120, thereby causing the door insert 110 to move from the retracted position to the starting position (i.e., the starting position shown in FIG. 4).

In practice, the piston 114 has a diameter, the second piston 124 has a second diameter, and in some embodiments, the distance traversed by the second piston 124 (and thus, the distance traversed by the door insert 110) can be controlled by selecting the respective diameters of the piston 114 and the second piston 124. In particular, a ratio of the diameter of the piston 114 to the second diameter of the second piston 124 corresponds to a ratio of a distance traversed by the piston 114 during application of the load to a distance traversed by the door insert 110 during movement between the starting position and the retracted position. For example, the diameter of the piston 114 can be larger than the second diameter of the second piston 124, in which case the distance traversed by the piston 114 can cause the second piston 124 to traverse a second, larger distance. As a more particular example, for each 2.54 centimeters (1 inch) that the piston 114 travels, the door insert 110 can be pushed in by 10.16 centimeters (4 inches) to 12.7 centimeters (5 inches). Other examples are possible as well.

Figure 6:
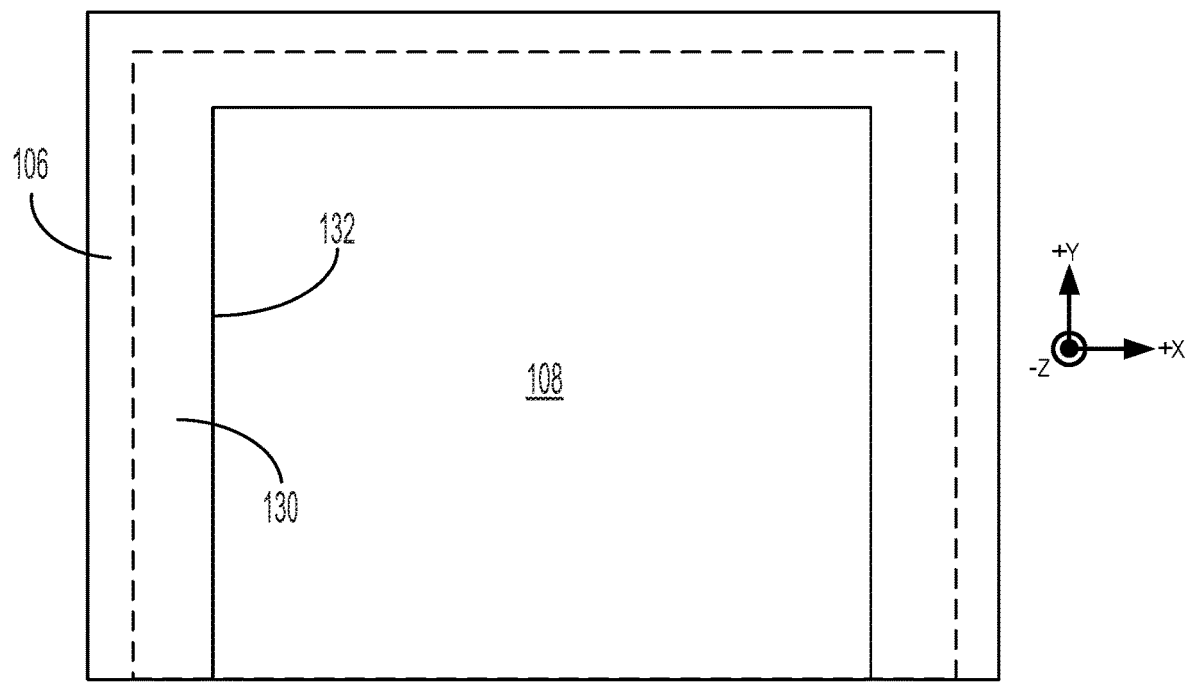
FIG. 6 depicts a section of the seating system of FIG. 1, according to an example implementation.

FIG. 6 depicts a front view of a section 130 of the seating system 100. This view is shown to establish how the door insert 110 can be moveably inserted into the wall structure 106. Representative borders of the section 130 are designated in FIG. 6 by a dashed line and by a surface 132 of the wall structure 106 that defines the periphery of the compartment 108. FIG. 6 also includes representative x, y, and z axes. In practice, the door insert (not shown) moves in the +z direction and −z direction.

Figure 7:
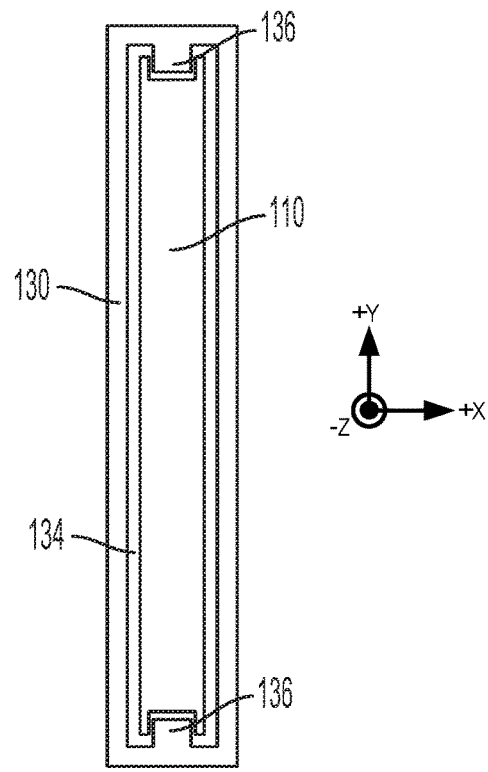
FIG. 7 depicts an example mounting of a door insert of the seating system of FIG. 1, according to an example implementation.

FIG. 7 depicts an example manner in which the door insert 110 can be mounted. In particular, FIG. 7 shows a pocket 134 disposed within the section 130 of the wall structure 106, as well as a track 136 coupled to the wall structure 106 within the pocket 134. FIG. 7 also shows the door insert 110 (or, more particularly, a portion of the door insert 110 that is inserted into the pocket 134) mounted on, and movable along, the track 136 in the +z and −z directions. The pocket 134 is a space in which the door insert 110 (or a portion thereof) is moveable.

The track 136 is a physical structure onto which the door insert 110 can be mounted and along which the door insert 110 can move. In some embodiments, the track 136 can be integral with the section 130, such as protrusion of the wall structure 106 that protrudes into the pocket 134, or a recess in the section 130 into which the door insert 110 can be placed. In alternative embodiments, the track 136 can be a separate structure, such as a metal rail or rail made from another material, that is coupled (e.g., fastened) to the section 130 within the pocket 134. Other examples are possible as well.

Figure 8:
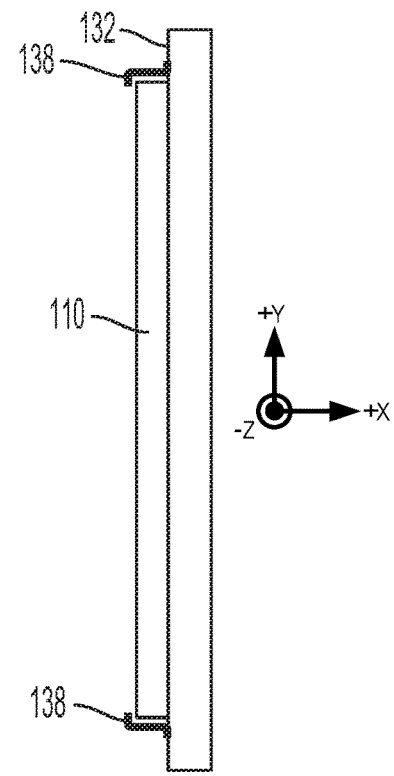
FIG. 8 depicts another example mounting of a door insert of the seating system of FIG. 1, according to an example implementation.

FIG. 8 depicts another example manner in which the door insert 110 can be mounted. In particular, instead of the door insert 110 being mounted to the track 136 within the pocket 134 as shown in FIG. 7, FIG. 8 shows a track 138 coupled to a side of the section 130—namely, on the surface 132 of the wall structure 106 that defines the periphery of the compartment 108. As so arranged, the door insert 110 is moveable along the track 138 in the +z and −z directions. In contrast to the section 130 shown in FIG. 7, the section 130 shown in FIG. 8 is solid and without the pocket 134.

Similar to the track 136 shown in FIG. 7, the track 138 is a physical structure onto which the door insert 110 can be mounted and along which the door insert 110 can move. In some embodiments, the track 138 can be integral with the section 130, such as protrusion of the wall structure 106 that protrudes into the compartment 108, or a recess in the section 130 into which the door insert 110 can be placed. In alternative embodiments, the track 138 can be a separate structure, such as a rail, that is coupled (e.g., fastened) to the surface 132. Other examples are possible as well.

Figure 9:
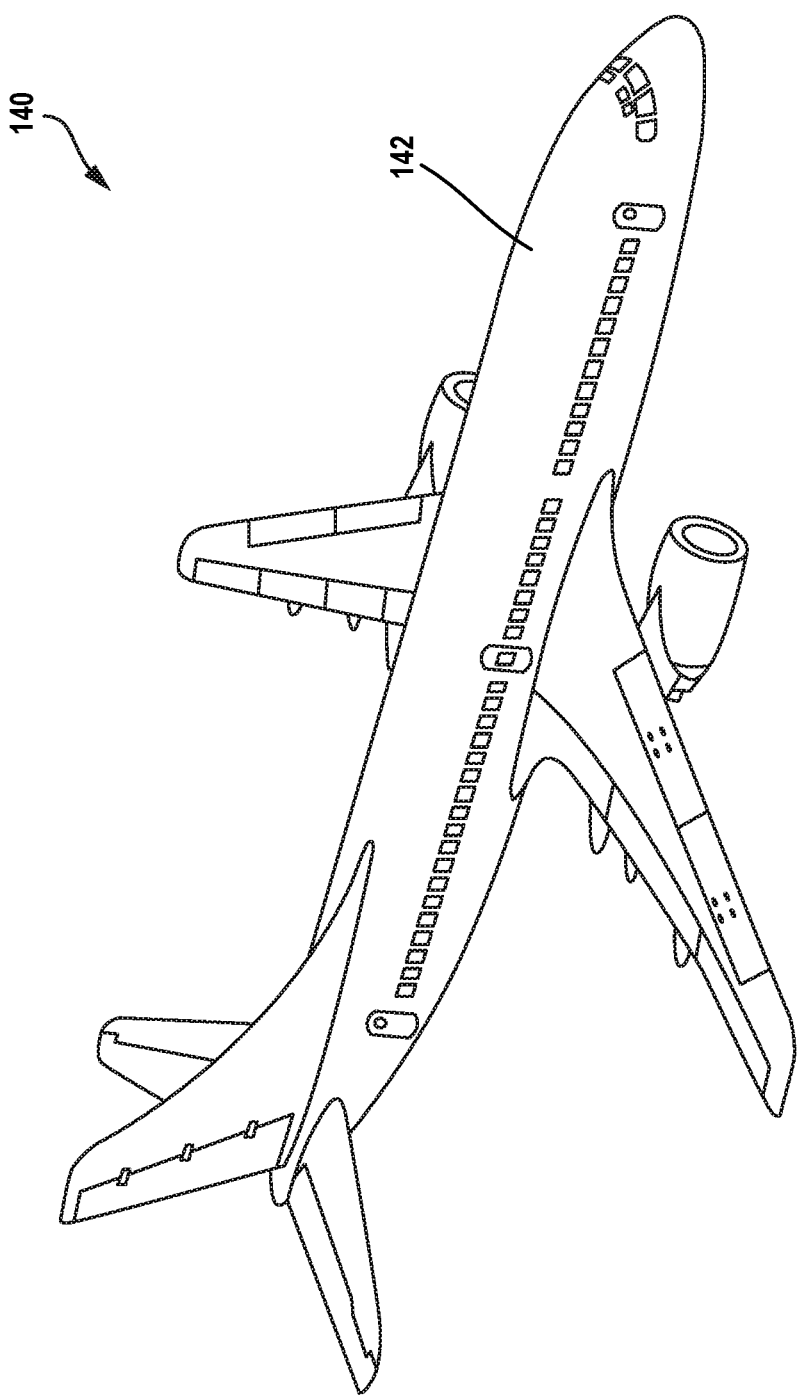
FIG. 9 is a perspective view of an aircraft, according to an example implementation.

FIG. 9 is a perspective view of an aircraft 140. As noted above, the floor structure 116 (not shown in FIG. 9) and/or other components of or relating to the seating system 100 can be arranged within a fuselage 142 of the aircraft 140.

Figure 10:
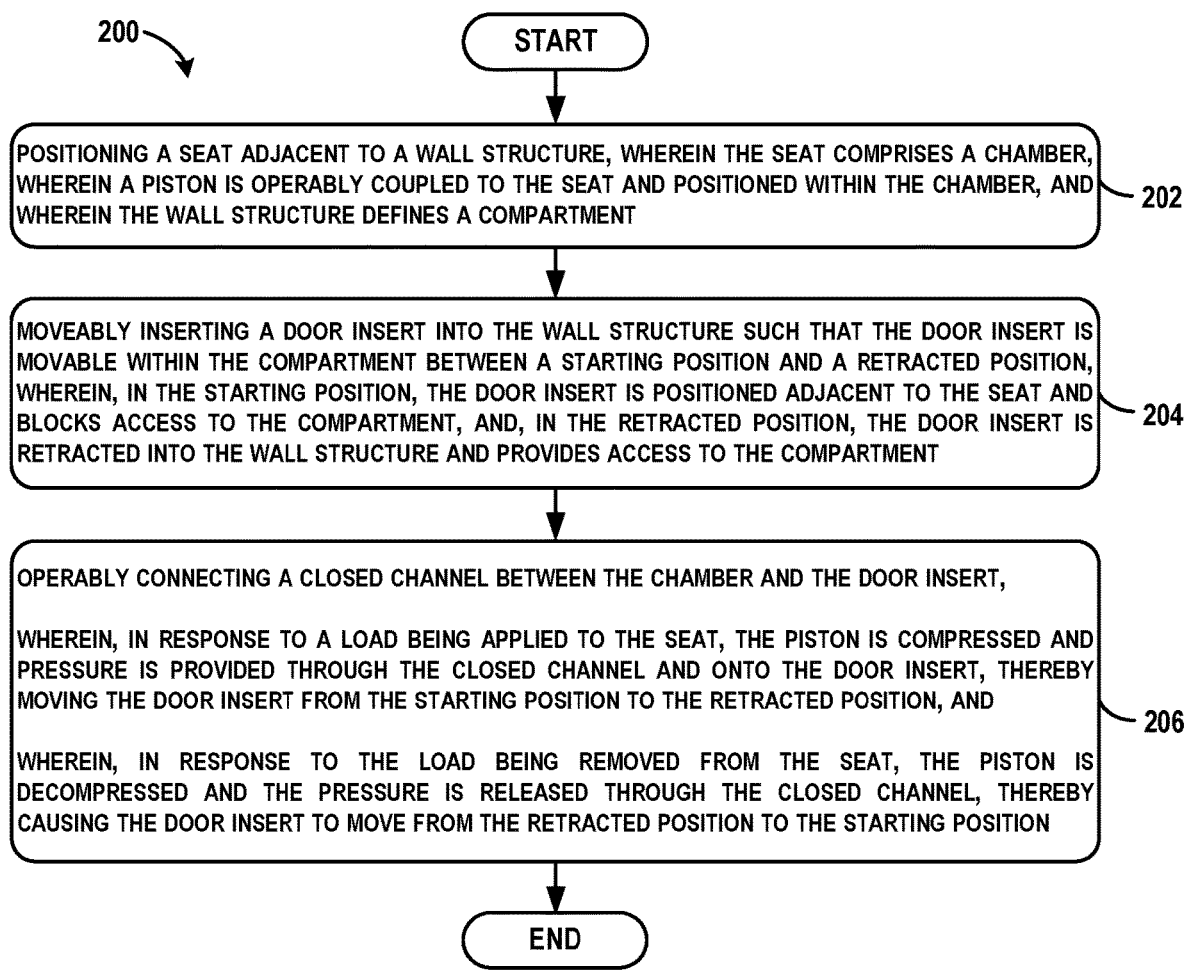
FIG. 10 shows a flowchart of an example method for assembling the seating system of FIG. 1, according to an example implementation.

FIG. 10 shows a flowchart of an example of a method 200 that could be used with the seating system 100 shown in FIGS. 1, 2, 3, 4, 5, 6, 7, 8, and/or 9, particularly for assembling the seating system 100. Method 200 may include one or more operations, functions, or actions as illustrated by one or more of blocks 202-206.

At block 202, the method 200 includes positioning a seat adjacent to a wall structure, wherein the seat comprises a chamber, wherein a piston is operably coupled to the seat and positioned within the chamber, and wherein the wall structure defines a compartment.

At block 204, the method 200 includes moveably inserting a door insert into the wall structure such that the door insert is movable within the compartment between a starting position and a retracted position, wherein, in the starting position, the door insert is positioned adjacent to the seat and blocks access to the compartment, and, in the retracted position, the door insert is retracted into the wall structure and provides access to the compartment.

At block 206, the method 200 includes operably connecting a closed channel between the chamber and the door insert, wherein, in response to a load being applied to the seat, the piston is compressed and pressure is provided through the closed channel and onto the door insert, thereby moving the door insert from the starting position to the retracted position, and wherein, in response to the load being removed from the seat, the piston is decompressed and the pressure is released through the closed channel, thereby causing the door insert to move from the retracted position to the starting position.

Figure 11:
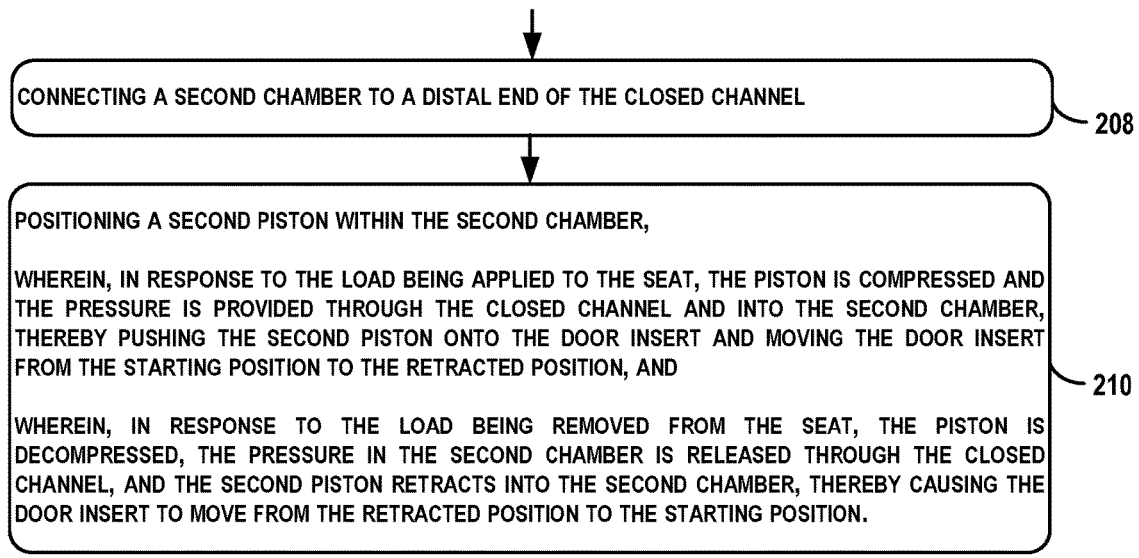
FIG. 11 shows a flowchart of an example method for use with the method of FIG. 10, according to an example implementation.

FIG. 11 shows a flowchart of another example method for use with the method 200. At block 208, functions include connecting a second chamber to a distal end of the closed channel. At block 210, functions include positioning a second piston within the second chamber, wherein, in response to the load being applied to the seat, the piston is compressed and the pressure is provided through the closed channel and into the second chamber, thereby pushing the second piston onto the door insert and moving the door insert from the starting position to the retracted position, and wherein, in response to the load being removed from the seat, the piston is decompressed, the pressure in the second chamber is released through the closed channel, and the second piston retracts into the second chamber, thereby causing the door insert to move from the retracted position to the starting position.

Figure 12:
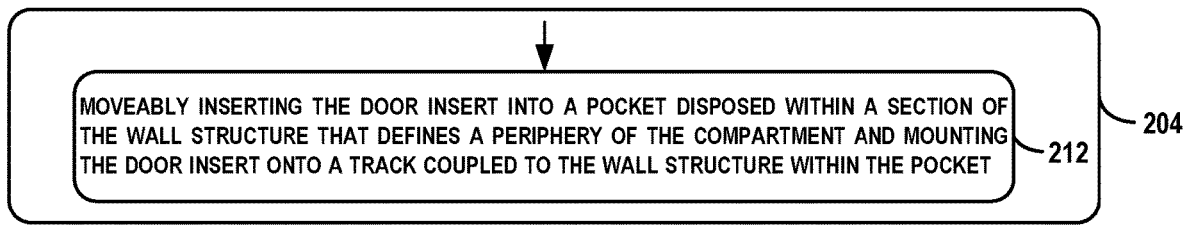
FIG. 12 shows a flowchart of an example method for performing the inserting function of the method of FIG. 10, according to an example implementation.

FIG. 12 shows a flowchart of an example method for performing the inserting as shown in block 204. At block 212, functions include moveably inserting the door insert into a pocket disposed within a section of the wall structure that defines a periphery of the compartment and mounting the door insert onto a track coupled to the wall structure within the pocket.

Figure 13:
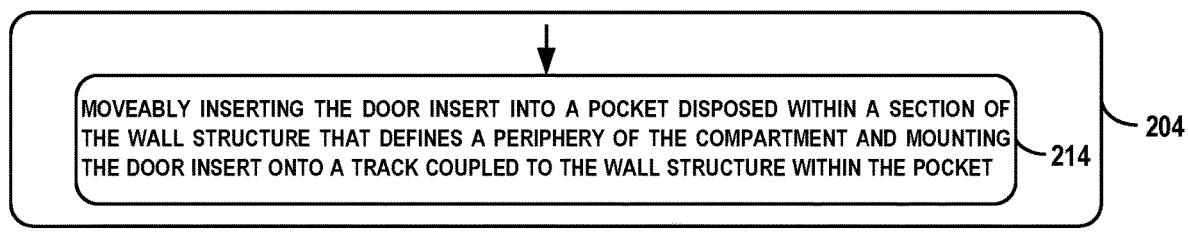
FIG. 13 shows a flowchart of another example method for performing the inserting function of the method of FIG. 10, according to an example implementation.

FIG. 13 shows a flowchart of an example method for performing the inserting as shown in block 204. At block 214, functions include moveably mounting the door insert onto a track coupled to a surface of the wall structure that defines a periphery of the compartment.

Figure 14:
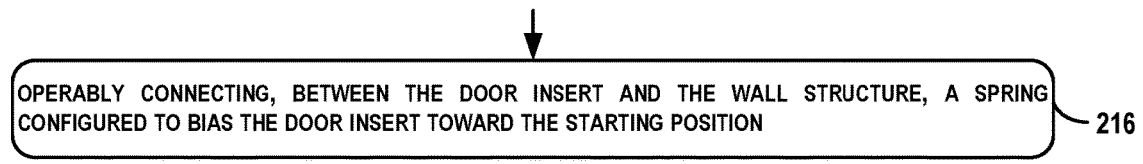
FIG. 14 shows a flowchart of another example method for use with the method of FIG. 10, according to an example implementation.

FIG. 14 shows a flowchart of another example method for use with the method 200. At block 216, functions include operably connecting, between the door insert and the wall structure, a spring configured to bias the door insert toward the starting position.

Devices or systems may be used or configured to perform logical functions presented in FIGS. 10, 11, 12, 13, and 14. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Although blocks in FIGS. 10, 11, 12, 13, and 14, are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for these and other processes and methods disclosed herein, flowcharts show functionality and operation of one possible implementation of present examples. In this regard, each block or portions of each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block or portions of each block in FIGS. 10, 11, 12, 13, and 14 may represent circuitry that is wired to perform the specific logical functions in the process. Alternative implementations are included within the scope of the examples of the present disclosure in which functions may be executed out of order from that shown or discussed, including substantially concurrent or in reverse order, depending on the functionality involved, as would be understood by those reasonably skilled in the art.

Different examples of the system(s), device(s), and method(s) disclosed herein include a variety of components, features, and functionalities. It should be understood that the various examples of the system(s), device(s), and method(s) disclosed herein may include any of the components, features, and functionalities of any of the other examples of the system(s), device(s), and method(s) disclosed herein in any combination or any sub-combination, and all of such possibilities are intended to be within the scope of the disclosure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A seating system comprising:
    a seat comprising a chamber;
    a wall structure positioned adjacent to the seat, wherein the wall structure defines a compartment;
    a door insert configured to move within the compartment between a starting position and a retracted position, wherein:
        in the starting position, the door insert is positioned adjacent to the seat and blocks access to the compartment, and
        in the retracted position, the door insert is retracted into the wall structure and provides access to the compartment;
    a closed channel extending from the chamber and operably connected to the door insert; and
    a piston operably coupled to the seat and positioned within the chamber, wherein:
        in response to a load being applied to the seat, the piston is compressed and pressure is provided through the closed channel and onto the door insert, thereby moving the door insert from the starting position to the retracted position, and
        in response to the load being removed from the seat, the piston is decompressed and the pressure is released through the closed channel, thereby causing the door insert to move from the retracted position to the starting position.

2. The seating system of claim 1, wherein the piston is a first piston, the seating system further comprising:
    a second chamber connected to a distal end of the closed channel; and
    a second piston positioned within the second chamber, wherein:
        in response to the load being applied to the seat, the first piston is compressed and the pressure is provided through the closed channel and into the second chamber, thereby pushing the second piston onto the door insert and moving the door insert from the starting position to the retracted position, and
        in response to the load being removed from the seat, the first piston is decompressed, the pressure in the second chamber is released through the closed channel, and the second piston retracts into the second chamber, thereby causing the door insert to move from the retracted position to the starting position.

3. The seating system of claim 2, wherein a diameter of the first piston is larger than a second diameter of the second piston, and
    wherein a ratio of the diameter to the second diameter corresponds to a ratio of a distance traversed by the first piston during application of the load to a distance traversed by the door insert during movement between the starting position and the retracted position.

4. The seating system of claim 1, wherein the door insert comprises a recess that houses a portion of the seat when the door insert is in the starting position.

5. The seating system of claim 1, wherein a pocket is disposed within a section of the wall structure that defines a periphery of the compartment, the seating system further comprising:
    a track coupled to the wall structure within the pocket, wherein the door insert is mounted on, and movable along, the track.

6. The seating system of claim 1, further comprising:
    a track coupled to a surface of the wall structure that defines a periphery of the compartment, wherein the door insert is mounted on, and movable along, the track.

7. The seating system of claim 1, further comprising:
    a spring operably connected between the door insert and the wall structure, wherein the spring is configured to bias the door insert toward the starting position.

8. The seating system of claim 1, wherein the door insert comprises a flange onto which the pressure is provided when the load is applied to the seat.

9. The seating system of claim 1, wherein the door insert is configured to move horizontally within the compartment between the starting position and the retracted position.

10. The seating system of claim 1, wherein the compartment is an open space configured for legs of a user.

11. A method for assembling a seating system, the method comprising:
    positioning a seat adjacent to a wall structure, wherein the seat comprises a chamber, wherein a piston is operably coupled to the seat and positioned within the chamber, and wherein the wall structure defines a compartment;
    moveably inserting a door insert into the wall structure such that the door insert is movable within the compartment between a starting position and a retracted position, wherein, in the starting position, the door insert is positioned adjacent to the seat and blocks access to the compartment, and, in the retracted position, the door insert is retracted into the wall structure and provides access to the compartment; and
    operably connecting a closed channel between the chamber and the door insert,
    wherein, in response to a load being applied to the seat, the piston is compressed and pressure is provided through the closed channel and onto the door insert, thereby moving the door insert from the starting position to the retracted position, and wherein, in response to the load being removed from the seat, the piston is decompressed and the pressure is released through the closed channel, thereby causing the door insert to move from the retracted position to the starting position.

12. The method of claim 11, wherein the piston is a first piston, the method further comprising:

connecting a second chamber to a distal end of the closed channel; and positioning a second piston within the second chamber, wherein, in response to the load being applied to the seat, the first piston is compressed and the pressure is provided through the closed channel and into the second chamber, thereby pushing the second piston onto the door insert and moving the door insert from the starting position to the retracted position, and wherein, in response to the load being removed from the seat, the first piston is decompressed, the pressure in the second chamber is released through the closed channel, and the second piston retracts into the second chamber, thereby causing the door insert to move from the retracted position to the starting position.

13. The method of claim 11, wherein moveably inserting the door insert into the wall structure comprises moveably inserting the door insert into a pocket disposed within a section of the wall structure that defines a periphery of the compartment and mounting the door insert onto a track coupled to the wall structure within the pocket.

14. The method of claim 11, wherein moveably inserting the door insert into the wall structure comprises moveably mounting the door insert onto a track coupled to a surface of the wall structure that defines a periphery of the compartment.

15. The method of claim 11, further comprising:

operably connecting, between the door insert and the wall structure, a spring configured to bias the door insert toward the starting position.

16. An aircraft comprising:

a fuselage;

a floor structure arranged within the fuselage; and a seating system, wherein the seating system comprises:

a wall structure coupled to the floor structure and extending vertical to the floor structure, wherein the wall structure defines a compartment;

a seat positioned adjacent to the wall structure, the seat comprising a chamber;

a door insert configured to move within the compartment between a starting position and a retracted position, wherein:

in the starting position, the door insert is positioned adjacent to the seat and blocks access to the compartment, and in the retracted position, the door insert is retracted into the wall structure and provides access to the compartment;

a closed channel extending from the chamber and operably connected to the door insert; and a piston operably coupled to the seat and positioned within the chamber, wherein:

in response to a load being applied to the seat, the piston is compressed and pressure is provided through the closed channel and onto the door insert, thereby moving the door insert from the starting position to the retracted position, and in response to the load being removed from the seat, the piston is decompressed and the pressure is released through the closed channel, thereby causing the door insert to move from the retracted position to the starting position.

17. The aircraft of claim 16, wherein the piston is a first piston, and wherein the seating system further comprises:

a second chamber connected to a distal end of the closed channel; and a second piston positioned within the second chamber, wherein:

in response to the load being applied to the seat, the first piston is compressed and the pressure is provided through the closed channel and into the second chamber, thereby pushing the second piston onto the door insert and moving the door insert from the starting position to the retracted position, and in response to the load being removed from the seat, the first piston is decompressed, the pressure in the second chamber is released through the closed channel, and the second piston retracts into the second chamber, thereby causing the door insert to move from the retracted position to the starting position.

18. The aircraft of claim 16, wherein the door insert comprises a recess that houses a portion of the seat when the door insert is in the starting position.

19. The aircraft of claim 16, wherein the door insert is configured to move horizontally within the compartment between the starting position and the retracted position.

20. The aircraft of claim 16, further comprising:

a spring operably connected between the door insert and the wall structure, wherein the spring is configured to bias the door insert toward the starting position.

* * * * *